US009702396B2

(12) United States Patent
Liebscher et al.

(10) Patent No.: US 9,702,396 B2
(45) Date of Patent: Jul. 11, 2017

(54) FASTENERS WITH DUAL SKIN DEPTH WASHERS

(71) Applicant: Alcoa Inc., Pittsburgh, PA (US)

(72) Inventors: Andreas Liebscher, San Diego, CA (US); Luke Haylock, Culver City, CA (US); Gregory Rizza, Westminster, CA (US); Hasim Mulazimoglu, La Habra, CA (US); Wudhidham Prachumsri, Torrance, CA (US); Rodrigo Pinheiro, Riverside, CA (US); Manish Kamal, Seal Beach, CA (US)

(73) Assignee: Arconic Inc., Pittsburgh, PA (US)

( * ) Notice: Subject to any disclaimer, the term of this patent is extended or adjusted under 35 U.S.C. 154(b) by 0 days.

(21) Appl. No.: 14/854,329

(22) Filed: Sep. 15, 2015

(65) Prior Publication Data

US 2016/0076581 A1    Mar. 17, 2016

Related U.S. Application Data

(60) Provisional application No. 62/051,693, filed on Sep. 17, 2014.

(51) Int. Cl.
*F16B 43/00* (2006.01)
*B64D 45/02* (2006.01)
(Continued)

(52) U.S. Cl.
CPC ............ *F16B 43/001* (2013.01); *B64D 45/02* (2013.01); *F16B 33/008* (2013.01); *F16B 33/06* (2013.01)

(58) Field of Classification Search
CPC ...... F16B 33/008; F16B 33/06; F16B 43/001; F16B 43/002; F16B 43/00
(Continued)

(56) References Cited

U.S. PATENT DOCUMENTS 1,868,415 A * 7/1932 Gundersen ............ B23G 9/001
29/416
2,058,452 A * 10/1936 Hoffman ................ F16B 43/00
411/371.2
(Continued)

FOREIGN PATENT DOCUMENTS

CN          2849293 Y     12/2006
CN        101598165 A     12/2009
(Continued)

OTHER PUBLICATIONS

International Search Report and Written Opinion issued in International Patent Application No. PCT/US2010/053342 entitled "Enhanced Conductivity Sleeved Fastener and Method for Making Same" (11 pages).
(Continued)

*Primary Examiner* — Roberta Delisle
(74) *Attorney, Agent, or Firm* — Greenberg Traurig, LLP

(57) ABSTRACT

A fastener including a pin member with an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank. The fastener includes a washer installed on the pin member against the bearing surface of the head of the pin member. The washer includes an outer surface and at least one dielectric gasket layer located on the outer surface of the washer.

11 Claims, 3 Drawing Sheets

(51) Int. Cl.
 *F16B 33/06* (2006.01)
 *F16B 33/00* (2006.01)
(58) Field of Classification Search
 USPC .............................................. 411/371.2, 534
 See application file for complete search history.

(56) References Cited

U.S. PATENT DOCUMENTS

| | | | |
|---|---|---|---|
| 2,179,068 A * | 11/1939 | Sprague | G01L 1/14 |
| | | | 361/291 |
| 2,396,661 A | 3/1946 | Keller et al. | |
| 2,501,567 A | 3/1950 | Huck | |
| 2,672,069 A * | 3/1954 | Mitchell | F16B 43/00 |
| | | | 411/368 |
| 2,940,767 A | 6/1960 | Quayle | |
| 3,041,912 A | 7/1962 | Kreider et al. | |
| 3,215,024 A | 11/1965 | Brilmyer et al. | |
| 3,271,058 A | 9/1966 | Anderson | |
| 3,298,270 A * | 1/1967 | Launay | F16B 39/26 |
| | | | 277/640 |
| 3,304,109 A | 2/1967 | Schuster | |
| 3,464,306 A | 9/1969 | Reynolds et al. | |
| 3,535,911 A | 10/1970 | Armstrong et al. | |
| 3,588,640 A * | 6/1971 | Fabricius | 361/293 |
| 3,613,338 A * | 10/1971 | Furtaw | A01D 34/81 |
| | | | 56/10.1 |
| 3,792,933 A | 2/1974 | Stencel | |
| 3,820,297 A | 6/1974 | Hurd | |
| 3,835,615 A | 9/1974 | King, Jr. | |
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,042,752 A * | 8/1977 | Hage | F16B 33/008 |
| | | | 428/626 |
| 4,048,898 A | 9/1977 | Salter | |
| 4,074,011 A * | 2/1978 | Teramae | C23C 22/83 |
| | | | 106/14.12 |
| 4,091,173 A * | 5/1978 | Hage | F16B 33/008 |
| | | | 411/387.1 |
| 4,102,030 A | 7/1978 | King, Jr. | |
| 4,114,505 A * | 9/1978 | Loeser | F16B 33/06 |
| | | | 205/196 |
| 4,164,807 A | 8/1979 | King, Jr. | |
| 4,244,661 A | 1/1981 | Dervy | |
| 4,310,273 A * | 1/1982 | Kirrish | F16B 5/0233 |
| | | | 411/338 |
| 4,405,256 A | 9/1983 | King, Jr. | |
| 4,450,616 A * | 5/1984 | Morita | B23P 19/068 |
| | | | 148/402 |
| 4,472,096 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,586,963 A * | 5/1986 | Smith | C10M 173/00 |
| | | | 148/257 |
| 4,628,402 A | 12/1986 | Covey | |
| 4,642,011 A * | 2/1987 | Uramoto | C08G 59/4085 |
| | | | 411/258 |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| 5,256,020 A * | 10/1993 | Ikeda | F16B 43/00 |
| | | | 411/368 |
| D372,857 S * | 8/1996 | Hirai | |
| 5,829,933 A * | 11/1998 | Kramer | F16B 43/00 |
| | | | 411/156 |
| 6,149,363 A | 11/2000 | March | |
| 6,213,699 B1 | 4/2001 | Sadri et al. | |
| 6,499,926 B2 | 12/2002 | Keener | |
| 6,589,918 B2 | 7/2003 | Denpo et al. | |
| 6,659,699 B2 | 12/2003 | Stoewer et al. | |
| 6,665,922 B2 | 12/2003 | Schultz | |
| 7,050,286 B2 | 5/2006 | Pridham et al. | |
| 7,236,343 B2 | 6/2007 | Heidlebaugh et al. | |
| 7,277,266 B1 | 10/2007 | Le et al. | |
| 7,307,825 B2 | 12/2007 | De La Fuente De Anna et al. | |
| 7,326,015 B2 | 2/2008 | Reynolds, Jr. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,755,876 B2 | 7/2010 | Morrill et al. | |
| 7,869,181 B2 | 1/2011 | Le | |
| 7,898,785 B2 | 3/2011 | Winter et al. | |
| 7,969,706 B2 | 6/2011 | Heeter et al. | |
| 8,312,606 B2 | 11/2012 | Reid et al. | |
| 8,573,910 B2 | 11/2013 | March et al. | |
| 8,636,455 B2 | 1/2014 | Wehrmeister et al. | |
| 8,647,035 B2 | 2/2014 | Bakken et al. | |
| 9,123,998 B1 | 9/2015 | LoRe | |
| 2002/0119028 A1 | 8/2002 | Brown et al. | |
| 2004/0052610 A1 * | 3/2004 | Kaupanger | F16B 23/0038 |
| | | | 411/371.2 |
| 2004/0091331 A1 | 5/2004 | Schultz | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2007/0258182 A1 | 11/2007 | Morrill et al. | |
| 2008/0075555 A1 | 3/2008 | March | |
| 2008/0240925 A1 | 10/2008 | Kita et al. | |
| 2009/0060666 A1 | 3/2009 | Georgeson et al. | |
| 2009/0074540 A1 * | 3/2009 | Evanbar | F16B 5/0241 |
| | | | 411/542 |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sánchez-Brunete Álvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2010/0278616 A1 | 11/2010 | March | |
| 2011/0056718 A1 | 3/2011 | Gattus et al. | |
| 2014/0056664 A1 | 2/2014 | March | |
| 2014/0230228 A1 | 8/2014 | Whitlock et al. | |

FOREIGN PATENT DOCUMENTS

| | | |
|---|---|---|
| CN | 102556357 A | 7/2012 |
| CN | 202867484 U | 4/2013 |
| CN | 203248487 | 10/2013 |
| CN | 205013476 U | 2/2016 |
| DE | 202 10 801 U1 | 10/2002 |
| DE | 10 2010 009901 A1 | 9/2011 |
| DE | 102011120541 A1 | 6/2013 |
| DE | 102013000308 A1 | 7/2014 |
| EP | 0217312 A2 | 4/1987 |
| EP | 0248122 A2 | 12/1987 |
| EP | 0468563 A1 | 1/1992 |
| EP | 2 471 712 A2 | 7/2012 |
| EP | 2 615 314 A1 | 7/2013 |
| EP | 2805889 A1 | 11/2014 |
| FR | 2 165 404 A5 | 8/1973 |
| JP | 7151111 A | 12/1996 |

(56) References Cited

FOREIGN PATENT DOCUMENTS

WO   8705976 A1   10/1987
WO   2009/063060 A1   5/2009

OTHER PUBLICATIONS

International Search Report and Written Opinion issued in International Patent Application No. PCT/US07/78775, dated Oct. 22, 2008 (7 pages).
International Search Report and Written Opinion issued in International Patent Application No. PCT/US2010/029758, dated Sep. 7, 2010 (11 pages).
Notice of Opposition of European Patent Application No. 07116776, including English-language translation, filed Jan. 6, 2012.
ASTM International, "Standard Guide for Measuring and Reporting Friction Coefficients", Nov. 2008, pp. 1-12.
Huck International, Inc., Huck Aerospace Fasteners for Composite Structure, copyright 1992.
"Guide d'emploi des traitements de surfaces appliques aux problemes de frottement", including its English-language translation, copyright Technique and Documentation, 2000.
Huck Manufacturing Company, "Lightweight (GP) Interference Fit Fastener for Composite Materials", Apr. 1984.
Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.
Rockwell International, Space Systems Division, "Preload Measurement in Sleeve Bolts Using an Ultrasonic Technique", Feb. 1996, by Ajay Koshti.
Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.
Wrocklow University of Technology, Department of Mechanical Engineering, "The Statistical Correlation of the Coefficient of Friction and Wear Rate of PTFE Composites with Steel Counterface Roughness and Hardness", Wojciech Wielaba, 2002.
International Search Report and Written Opinion dated Dec. 14, 2015, issued by the European Patent Office in International (PCT) Application No. PCT/US2015/050105 (11 pages).
International Search Report and Written Opinion dated Dec. 17, 2015, issued by the European Patent Office in International (PCT) Application No. PCT/US2015/050091 (12 pages).

\* cited by examiner

FASTENERS WITH DUAL SKIN DEPTH WASHERS

CROSS-REFERENCE TO RELATED APPLICATION

This application is a Section 111(a) application relating to and claiming the benefit of commonly-owned, co-pending U.S. Provisional Patent Application Ser. No. 62/051,693, entitled "FASTENERS WITH DUAL SKIN DEPTH WASHERS," filed on Sep. 17, 2014, the entirety of which is incorporated herein by reference.

FIELD OF THE INVENTION

The present invention relates to fasteners and, more particularly, to fasteners having dual skin depth washers.

BACKGROUND OF THE INVENTION

Continuous fiber reinforced composites (CFRPs) are extensively used in both primary and secondary aircraft components for a variety of applications where light weight, higher strength, and corrosion resistance are primary concerns. Composites are typically composed of fine carbon fibers that are oriented at certain directions and surrounded in a supportive polymer matrix. Since the plies of the composite material are arranged at a variety of angles, and depending upon the direction of major loading, the resultant structure is typically a stacked laminated structure which is highly anisotropic and heterogeneous. A significant portion of the composite structure is fabricated as near net-shape, but is drilled in order to facilitate joining of components using mechanical fasteners. Drilling fastener holes in composite does not compare to the uniformity of aluminum or steel, since individual carbon fibers fracture at irregular angles and form microscopic voids between the fastener and the hole. As the cutting tool wears, there is an increase of surface chipping and an increase in the amount of uncut fibers or resin and delamination. The composite microstructure containing such defects is referred to as "machining-induced micro texture."

In addition to their machining challenges, composite structures in aircrafts are more susceptible to lightning damage compared to metallic structures. Metallic materials, such as aluminum, are very conductive and are able to dissipate the high currents resulting from a lightning strike. Carbon fibers are 100 times more resistive than aluminum to the flow of current. Similarly epoxy, which is often used as a matrix in conjunction with carbon fibers, is 1 million times more resistive than aluminum. The composite structural sections of an aircraft often behave like anisotropic electrical conductors. Consequently, lightning protection of a composite structure is more complex due to the intrinsic high resistance of carbon fibers and epoxy, the multi-layer construction, and the anisotropic nature of the structure. Some estimates indicate that, on average, each commercial aircraft in service is struck by lightning at least once per year. Aircraft flying in and around thunderstorms are often subjected to direct lightning strikes as well as to nearby lightning strikes, which may produce corona and streamer formations on the aircraft. In such cases, the lightning discharge typically originates at the aircraft and extends outward from the aircraft. While the discharge is occurring, the point of attachment moves from the nose of the aircraft and into the various panels that compromise the skin of the aircraft. The discharge usually leaves the aircraft structure through the empennage.

The protection of aircraft fuel systems against fuel vapor ignition due to lightning is even more critical. Since commercial aircraft contain relatively large amounts of fuel and also include very sensitive electronic equipment, they are required to comply with a specific set of requirements related to lightning strike protection in order to be certified for operation. Fasteners are often the primary pathways for the conduction of the lightning currents from skin of the aircraft to supporting structures such as spars or ribs, and poor electrical contact between the fastener body and the parts of the structure can lead to detrimental fastener-composite effects such as arcing, sparking, internal plasma formation, high surface temperatures, thermionic electron emission, and large vapor pressures.

To avoid these detrimental lightning initiated effects at the fastener-composite structure interface, some aircrafts use fasteners which are in intimate contact with the fastener and CFRP hole. Intimate contact between a bare metallic fastener and the hole in the composite structure has been known to improve electrical current dissipation. One approach to achieve fastener-to-composite hole intimacy is to use a sleeved fastener. This approach involves first inserting a close fitting sleeve into the hole. An interference-fit pin is then pulled into the sleeve, which expands the sleeve to bring it in intimate contact with the CFRP hole surfaces in the composite structure. Although sleeved fasteners substantially reduce the gap between the fastener and composite structure, it cannot eliminate the small gaps created due to presence of drilling induced micro texture on the inner hole surfaces. Machining induced texture also entraps excess fuel tank sealant, an insulating dielectric material, inhibiting intimate contact between the sleeve and hole. This situation becomes worse as the cutting tool wears resulting in more surface irregularities and larger machining induced surface defects. In addition, these larger sized holes need to be drilled to accommodate additional sleeve thickness, thus resulting in heavier structures.

In order to mitigate these types of lightning induced conditions, the high amplitude transient currents must be distributed throughout the carbon fiber structure and copper mesh embedded on the surface, with the majority of current flow occurring perpendicular to the fastener hole due to the anisotropy of the CFRP resistivity. If the fastener is not in intimate contact with the inside of the hole, the Joule heating energy contained within the frequency dependent skin depth regions will result in melting of metal surface layers and adjoining sealant layer, thus producing high vapor pressure regions. A typical lightning discharge can deliver 10-100 Coulombs of charge, which results in large voltage differentials across dielectric layers and gap regions. These high electric fields result in voltage breakdown phenomenon which is accelerated by increased vapor pressure (higher particle density) and results in arcing and spark formation. These effects are the catalyst for the formation of internal plasma (ionized gas) which reaches high temperatures and internal pressures within the volume between the fastener and hole. The intrinsic high conductivity of metallic fasteners and the large number of fasteners used in aircraft construction combine to create a condition of high probability of lightning attachment to fasteners and the formation of these effects.

In the development of new aircraft and changes in regulation requirements regarding lightning protection, it has become imperative that fastener designs are needed for aircraft structural areas which are unable to accommodate a sleeved fastener system. In many situations, the size of holes and proximity of fasteners is restricted due to mechanical limitations and thus alternative fastener designs are essential for lightning strike protection. The distribution of lightning current is highly dependent on establishing a good electrical contact between the fastener and CFRP. In the majority of composite systems, an interference-fit between the fastener and hole during installation results in additional breaking of carbon fibers and large shear forces that results in delamination and failure mechanisms (cracking) within composite layers.

SUMMARY OF THE INVENTION

In an embodiment, a fastener, comprising a pin member including an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank; and a washer installed on the pin member against the bearing surface of the head of the pin member, the washer includes an outer surface and at least one dielectric gasket layer located on the outer surface of the washer. In an embodiment, the washer is made of metal. In an embodiment, the washer is made of copper. In an embodiment, the washer is made of silver. In an embodiment, the at least one dielectric gasket layer of the washer includes a first coating. In an embodiment, the first coating includes a conductive metal coating. In an embodiment, the at least one dielectric gasket layer includes a plurality of dielectric gasket layers.

In an embodiment, the bearing surface of the head of the pin member is coated with a second coating. In an embodiment, the second coating is selected from the group consisting of tungsten, molybdenum, copper, and a refractory ceramic. In an embodiment, the outer surface of cylindrical shank portion of the pin member is coated with the second coating. In an embodiment, the threaded portion of the pin member is coated with a third coating. In an embodiment, the second coating is TEFLON® PTFE. In an embodiment, the washer includes a textured outer surface.

In an embodiment, a fastener adapted to be installed within a hole of a structure includes a pin member and a washer installed on the underside of a head of the pin member. In an embodiment, the fastener includes a locking member. In an embodiment, the locking member is a nut. In an embodiment, the pin member is a bolt. In an embodiment, the structure includes a composite structure. In another embodiment, the structure includes a metal structure. In another embodiment, the structure includes a fiber metal laminate structure.

In an embodiment, the washer is a dual, skin-depth metal washer. In an embodiment, the washer is a low-resistivity metal washer (e.g., in a range of about $10^{-6}$ to about $10^{-8}$ $\Omega*m$) having a thin dielectric layer. In another embodiment, the washer is a low-resistivity metal washer having no dielectric layer. In an embodiment, a thickness of the washer is so chosen so as to optimize skin depth for increased current flow along the fastener and into the carbon fiber composite layers of the structure in which the fastener is installed. In certain embodiments, the thickness of the coating of the washer is in a range from about 10 microns to about 250 microns. In an embodiment, separation between the washer surface and the underside of the head of the pin member by the dielectric layer of the washer enables parallel skin depth current conduction channels that effectively reduce the electrical input impedance of the fastener. In an embodiment, the washer is a soft metal washer that deforms under installation, which makes intimate contact with the carbon fibers and small voids of the composite structure.

In an embodiment, to achieve excellent electrical contact between selected areas of the fastener-composite interfaces and to mitigate damage to the holes of the structure, the fastener uses the electromagnetic properties of the fastener-composite system in conjunction with special material coatings to achieve high current flow and reduce Joule heating of surfaces. In an embodiment, low resistivity metals and alloys in the range of about $10^{-6}$-$10^{-8}$ $\Omega*m$ having melting temperatures above 2000° C. are used as multi-layered coatings on the fastener to improve charge transfer between surfaces and improve skin depth thickness through selective control of eddy current formation. In other embodiments, the low resistivity metals and alloys can have a resistivity greater than the aforesaid $10^{-6}$-$10^{-8}$ $\Omega*m$ range. In an embodiment, high-voltage isolation features are incorporated through application of special dielectric coatings having low leakage, flashover protection, and tracking resistance.

DETAILED DESCRIPTION OF THE DRAWINGS

Figure 2:
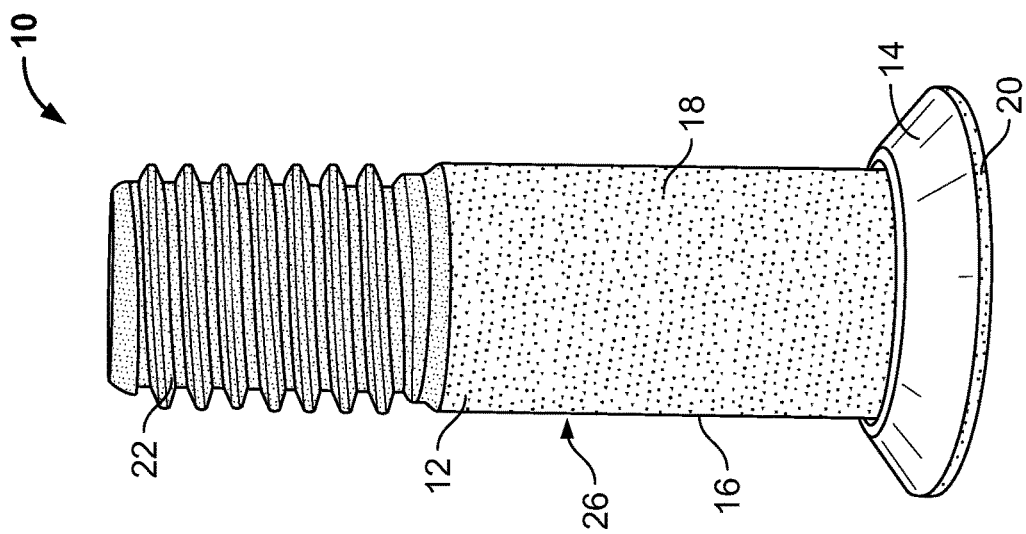
FIG. 2 shows an embodiment of a pin member coated with a first material and a second material.
Figure 1:
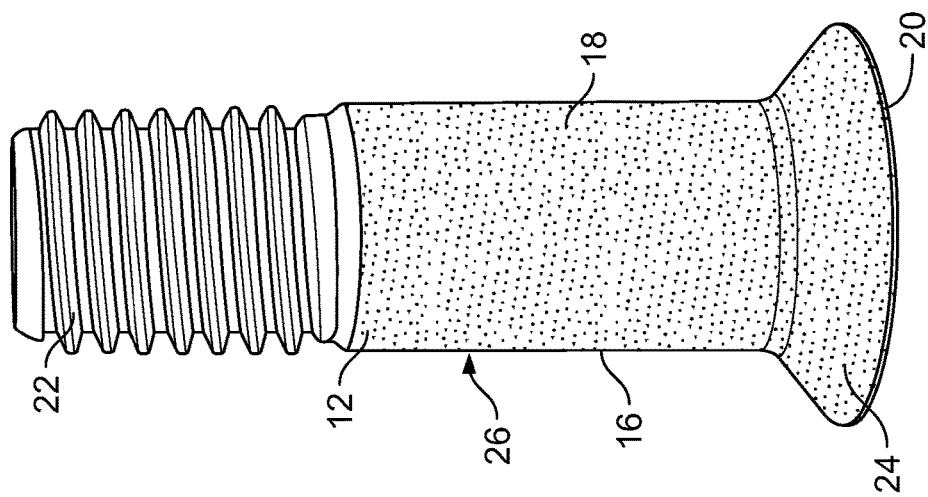
FIG. 1 shows an embodiment of a pin member coated with a first material.

Referring to FIGS. 1 through 4, in an embodiment, a fastener 10 includes a pin member 12 and a washer 14 installed on the pin member 12. In an embodiment, the pin member 12 includes an elongated shank 16 having a smooth cylindrical shank portion 18, a head 20 at one end of the smooth cylindrical shank portion 18, and a threaded portion 22 at an opposite end of the smooth cylindrical shank portion 18. In an embodiment, the head 20 is a countersunk head. In an embodiment, the head 20 includes a bearing surface 24 located on the underside of the head 20. In an embodiment, the pin member 12 is made of titanium. In an embodiment, the outer surfaces of the head 20, including the bearing surface 24 of the head 20, and the smooth cylindrical shank portion 18 are coated with a coating 26. In an embodiment, the coating 26 is tungsten. In another embodiment, the coating 26 is molybdenum. In another embodiment, the coating 26 is a refractory metal, such as titanium, tantalum, and niobium. In another embodiment, the coating 26 is a refractory ceramic, such as alumina ($Al_2O_3$), aluminosilicate (e.g. $Al_2SiO_5$, silica ($SiO_2$) or other metal oxides, and materials made from magnesite, dolomite, or chrome ore. In another embodiment, only the outer surfaces of the head 20 are coated with the coating 26. In another embodiment, only the outer surface of the smooth cylindrical shank portion 18 is coated with the coating 26. Referring to FIG. 2, in an embodiment, the smooth cylindrical shank portion 18 is coated with a first coating while the threaded portion is coated with a second coating that is different from the first coating. In an embodiment, the smooth cylindrical shank portion 18 is coated with tungsten, while the threaded portion 22 is coated with TEFLON® PTFE. In some embodiments, the smooth cylindrical shank portion 18 has a TEFLON® coat covering all other coatings. In other embodiments, the threaded portion 22 can be coated with other coatings, such as a polymer matrix coating or any other coatings that meet the requirements of NAS 4006.

Figure 4:
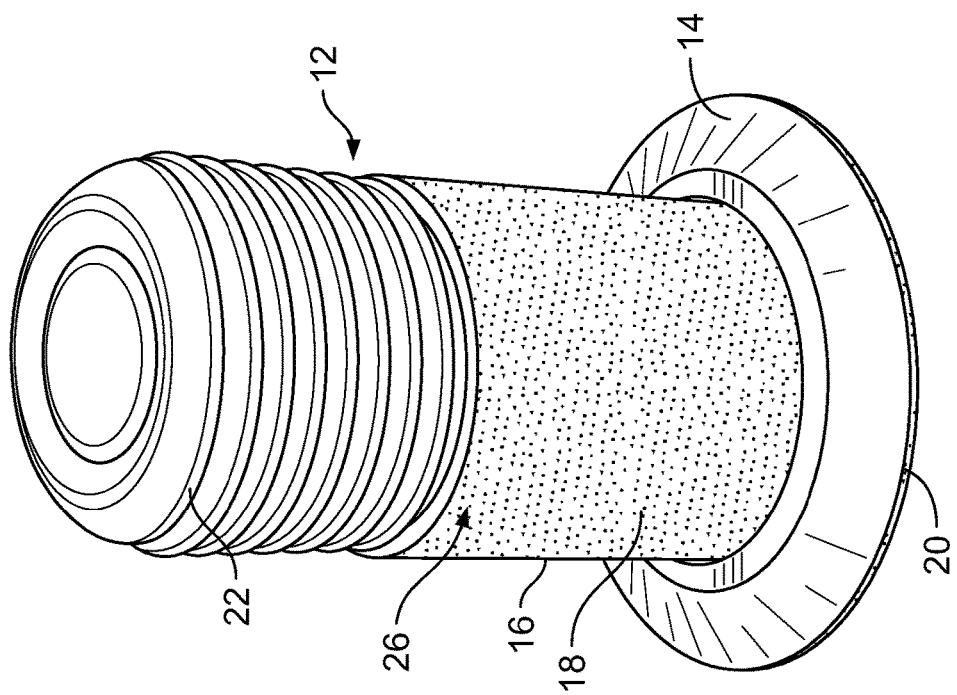
FIG. 4 is a perspective view of the pin member and the washer shown in FIGS. 1 and 3, respectively, assembled with one another.
Figure 3:
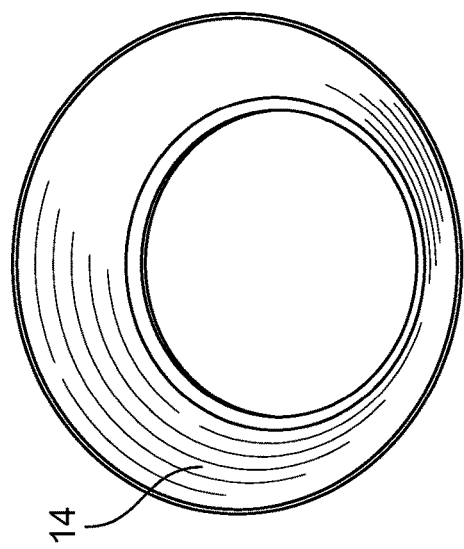
FIG. 3 is a perspective view of an embodiment of a washer.

Referring to FIGS. 2 through 4, in an embodiment, the washer 14 is installed on the pin member 12. In an embodiment, the washer 14 is installed against the bearing surface 24 of the head 18 of the pin member 12, as shown in FIGS. 2 and 4. In an embodiment, the washer 14 is frusto-conical in shape. In an embodiment, the washer 14 is made of metal. In an embodiment, the washer 14 is made of copper. In another embodiment, the washer 14 is made of silver. In an embodiment, the washer 14 is includes an outer surface and at least one dielectric gasket layer located on the outer surface, which provides a dual skin depth feature. In an embodiment, the dielectric gasket layer is created using plasma deposition techniques, electro-deposition, or other coating techniques. In another embodiment, the washer 14 is a dielectric washer having a conductive metal coating, such as silver, gold, tungsten, aluminum, and titanium. In an embodiment, the washer 14 is made from a metal that is galvanically compatible with titanium (e.g., mitigation of galvanic corrosion). In certain embodiments, the thickness of the coating 26 of the washer 14 is in a range from about 10 microns to about 250 microns, based on frequency dependent skin depth to achieve an optimal current flow-to-weight ratio. In another embodiment, the washer 14 includes a textured surface. In an embodiment, the textured surface and metal malleability of the washer 14 provides improved electrical contact between the fastener and carbon fibers in a structure. In an embodiment, the structure includes the composite structure. In another embodiment, the structure includes a metal structure. In another embodiment, the structure includes a fiber metal laminate structure.

Figure 5B:
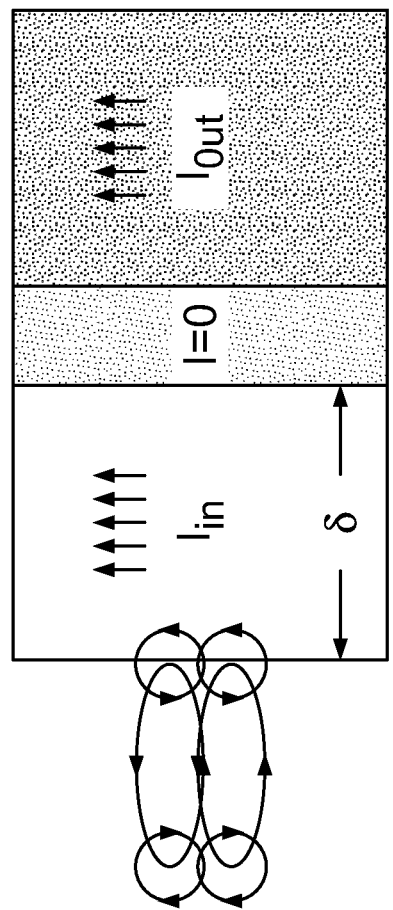
FIGS. 5A and 5B are diagrams showing the dual skin depth features of the washer.
Figure 5A:
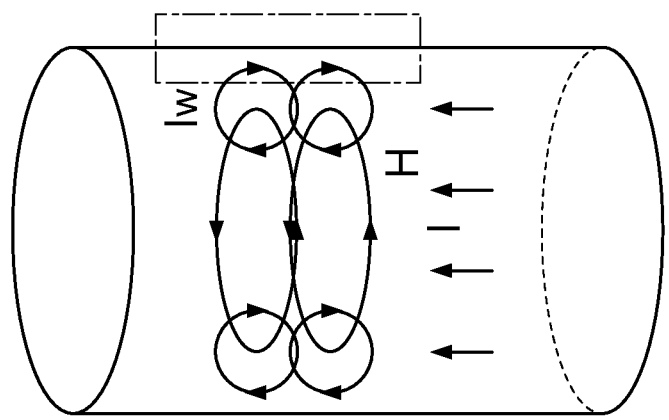

FIGS. 5A and 5B show an embodiment of the dual skin depth feature of the washer 14. The skin depth layer of the washer 14 is denoted as δ. As shown in FIGS. 5A and 5B, a bare metal washer contains induced eddy currents cancel core currents and results in surface current flow that is concentrated within the skin depth layer δ below the surface. In an embodiment, the surface of the washer 14 is coated with a highly insulating oxide layer having a thickness approximately equal to δ/10. In turn, then oxide layer is coated with a highly conductive layer, such as tungsten. As shown in FIGS. 5A and 5B, the highly conductive layer prevents eddy currents from forming as well as uncoupled flow. Thus, the edge current flow within the skin depth layer δ is isolated from the highly conductive layer.

In an embodiment, a method of installing a fastener is as follows:
  (1) Provide a pin member having a head. In an embodiment, the pin member is a bolt.
  (2) Insert a dielectric washer under the head of the pin member.
  (3) Insert a second, metal washer over the dielectric washer.
  (4) Install the pin member and washers in a hole of a composite structure.

In another embodiment, a method of installing a fastener is as follows:
  (1) Provide a pin member having a head. In an embodiment, the pin member is a bolt.
  (2) Insert a metal washer under the head of the pin member.
  (3) Install the pin member and washer in a hole of a composite structure.

In an embodiment, the fastener 10 is adapted to prevent formation of shear forces during installation that normally result in severe damage of carbon fiber composite panels with an interference-fit. In an embodiment, the fastener 10 provides lightning current flow from the fastener 10 to the surrounding carbon fiber composite through the electrically isolated washer 14 that reduces current density in the skin depth regulated surface layers on the bearing surface 24 of the head 18. In an embodiment, the gasket layer of the washer has a minimal voltage differential preventing dielectric breakdown while minimizing eddy current formation. In an embodiment, the electrical characteristics of the fastener 10 mitigates formation of plasma from arcing phenomenon due to the presence of multiple low impedance skin depth conduction regions for current distribution. In an embodiment, the washer 14, which is made of soft metal and in direct contact with the fastener 10, provides a large improvement of the skin depth and improves current flow. In an embodiment, separation between the washer 14 surface and the bearing surface 24 of the head 20 of the pin member 12 by the dielectric layer of the washer 14 enables parallel skin depth current conduction channels that effectively reduce the electrical input impedance of the fastener 10 by 50% or greater. In another embodiment, with no dielectric layer of the washer 14, the parallel skin depth current conduction channels can effectively reduce the electrical input impedance of the fastener 10 by 40% or greater.

In an embodiment, the malleable characteristics of the washer 14 enable intimate contact with the carbon fibers of the composite structure. The term "intimate contact" as used herein means that the outer surface of the washer 14 is deformed into all or substantially all of voids between the washer 14 and the composite structure. The washer 14 reduces charge buildup and increases current flow along top surface of fastener edges into the copper mesh and underneath the head 20. Sharp corners and bends present regions of high resistance and therefore multi-channel conduction paths are essential in regulating the formation of high-temperature Joule heating hot spots. The dielectric washer system enables the presence of dual conduction channels which not only reduces the current load but in the event of compromised electrical contact with the copper mesh ensures that at least another conduction path is available.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A fastener, comprising:
  a pin member including an elongated shank having a first end, a second end opposite the first end, a cylindrical shank portion having an outer surface, a head located at the first end of the elongated shank, the head including a bearing surface located on the underside of the head, and a threaded portion located at the second end of the elongated shank; and
  a washer installed on the pin member against the bearing surface of the head of the pin member, wherein the washer includes an outer surface and at least one dielectric gasket layer located on the outer surface of the washer, the dielectric gasket layer includes a first coating having a thickness in a range from about 10 microns to about 250 microns.

2. The fastener of claim 1, wherein the washer is made of metal.

3. The fastener of claim 2, wherein the washer is made of copper.

4. The fastener of claim 2, wherein the washer is made of silver.

5. The fastener of claim 2, wherein the washer includes a textured outer surface.

6. The fastener of claim 1, wherein the at least one dielectric gasket layer includes a plurality of dielectric gasket layers.

7. The fastener of claim 1, wherein the bearing surface of the head of the pin member is coated with a second coating.

8. The fastener of claim 7, wherein the second coating is selected from the group consisting of tungsten, molybdenum, copper, and a refractory ceramic.

9. The fastener of claim 7, wherein the outer surface of cylindrical shank portion of the pin member is coated with the second coating.

10. The fastener of claim 9, wherein the threaded portion of the pin member is coated with a third coating.

11. The fastener of claim 10, wherein the third coating is polytetrafluoroethylene.

\* \* \* \* \*

UNITED STATES PATENT AND TRADEMARK OFFICE
CERTIFICATE OF CORRECTION

PATENT NO. : 9,702,396 B2  
APPLICATION NO. : 14/854329  
DATED : July 11, 2017  
INVENTOR(S) : Andreas Liebscher et al.

Page 1 of 1

It is certified that error appears in the above-identified patent and that said Letters Patent is hereby corrected as shown below:

In the Specification

Column 5, Line 18, delete "is includes" and insert --includes--.

In the Claims

Column 7, Line 19, delete "of cylindrical" and insert --of the cylindrical--.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*